United States Patent
Chen

(10) Patent No.: US 6,843,536 B2
(45) Date of Patent: Jan. 18, 2005

(54) BRAKABLE WHEEL HUB DEVICE

(75) Inventor: Hubert Chen, Taichung (TW)

(73) Assignee: Kun Teng Industry Co., Ltd., Taichung Hsien (TW)

(*) Notice: Subject to any disclaimer, the term of this patent is extended or adjusted under 35 U.S.C. 154(b) by 0 days.

(21) Appl. No.: 10/392,981

(22) Filed: Mar. 21, 2003

(65) Prior Publication Data
US 2004/0183360 A1 Sep. 23, 2004

(51) Int. Cl.⁷ .............................................. B60B 1/00
(52) U.S. Cl. ............................ 301/110.5; 188/24.11; 188/26
(58) Field of Search ............................. 301/6.8, 110.5, 301/110.6; 188/24.11, 26

(56) References Cited

U.S. PATENT DOCUMENTS 1,000,354 A * 8/1911 Walker .......................... 188/26
4,625,838 A * 12/1986 Hopes ......................... 188/181 A

FOREIGN PATENT DOCUMENTS

JP 58-161601 * 9/1983
JP 3-197202 * 8/1991

* cited by examiner

Primary Examiner—Russell D. Stormer
(74) Attorney, Agent, or Firm—Foley & Lardner LLP

(57) ABSTRACT

A brakable wheel hub device includes a hub shell adapted to be rotatably mounted on a wheel axle. A spoke mounting member has a securing wall portion surrounding an axis and extending radially to confront and to be fastened to a brake disk, and a surrounding wall portion extending from the securing wall portion axially and confronting the hub shell radially to confine a surrounding space therebetween. A force transmitting member is received in the surrounding space, and has two frictional engaging surfaces to respectively and frictionally engage the hub shell and the surrounding wall portion such that the spoke mounting member is synchronously rotated with the hub shell.

9 Claims, 2 Drawing Sheets

BRAKABLE WHEEL HUB DEVICE

BACKGROUND OF THE INVENTION

1. Field of the Invention

This invention relates to a brakable wheel hub device, more particularly to a brakable wheel hub device adapted to be rotatably mounted on a wheel axle of a bicycle.

2. Description of the Related Art

A conventional brakable wheel hub device for a bicycle generally includes a wheel hub shell rotatably mounted on an axle by means of bearings. The wheel hub shell is formed by forging, and has inner and outer surrounding shell surfaces, an end attachment surface interposed between the inner and outer surrounding shell surfaces to engage a brake disk by means of screw fasteners, and first and second spoke carrying flanges extending from the outer surrounding shell surface radially and outwardly for carrying wheel spokes. The hub shell as such must be formed as a single-piece construction by forging and turning, thereby resulting in relative high manufacturing cost.

Another conventional brakable wheel hub device includes a tubular hub shell, first and second spoke carrying seats sleeved securely on two end portions of the hub shell, and a securing ring in a spline engagement with the first spoke carrying seat so as to connect securely with a brake disk by means of screws. Since the securing ring has to be manufactured and assembled separately the securing ring, the device is complicated and costly to fabricate.

SUMMARY OF THE INVENTION

The object of the present invention is to provide a brakable wheel hub device which is easy to fabricate at a relatively low cost.

According to this invention, the brakable wheel hub device includes a wheel hub shell having inner and outer surrounding shell surfaces which are disposed opposite to each other radially, and an annular right end surface which extends radially to communicate the inner surrounding shell surface with the outer surrounding shell surface. The inner surrounding shell surface is adapted to spacedly surround a wheel axle, and includes right and left inner surface segments proximate to and distal from the right end surface, respectively. A brake disk is adapted to be rotatable relative to the axle about an axis, and is outboard to and confronts the right end surface. A right spoke mounting member includes a securing wall portion and a surrounding wall portion. The securing wall portion is disposed to surround the axis, and is mounted inboard to the brake disk. The securing wall portion extends in radial directions relative to the axis to terminate at a periphery. The surrounding wall portion extends from the periphery of the securing wall portion leftwardly and axially so as to be adapted to engage wheel spokes, and has an inner tubular surface which confronts the outer surrounding shell surface radially to confine a surrounding space therebetween. A tightening member is disposed to bring the securing wall portion to abut against the brake disk. A force transmitting member is received in the surrounding space, and has inner and outer frictional engaging surfaces which are disposed opposite to each other radially, and which frictionally and respectively engage the outer surrounding shell surface and the inner tubular surface such that the right spoke mounting member is synchronously rotated with the wheel hub shell.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
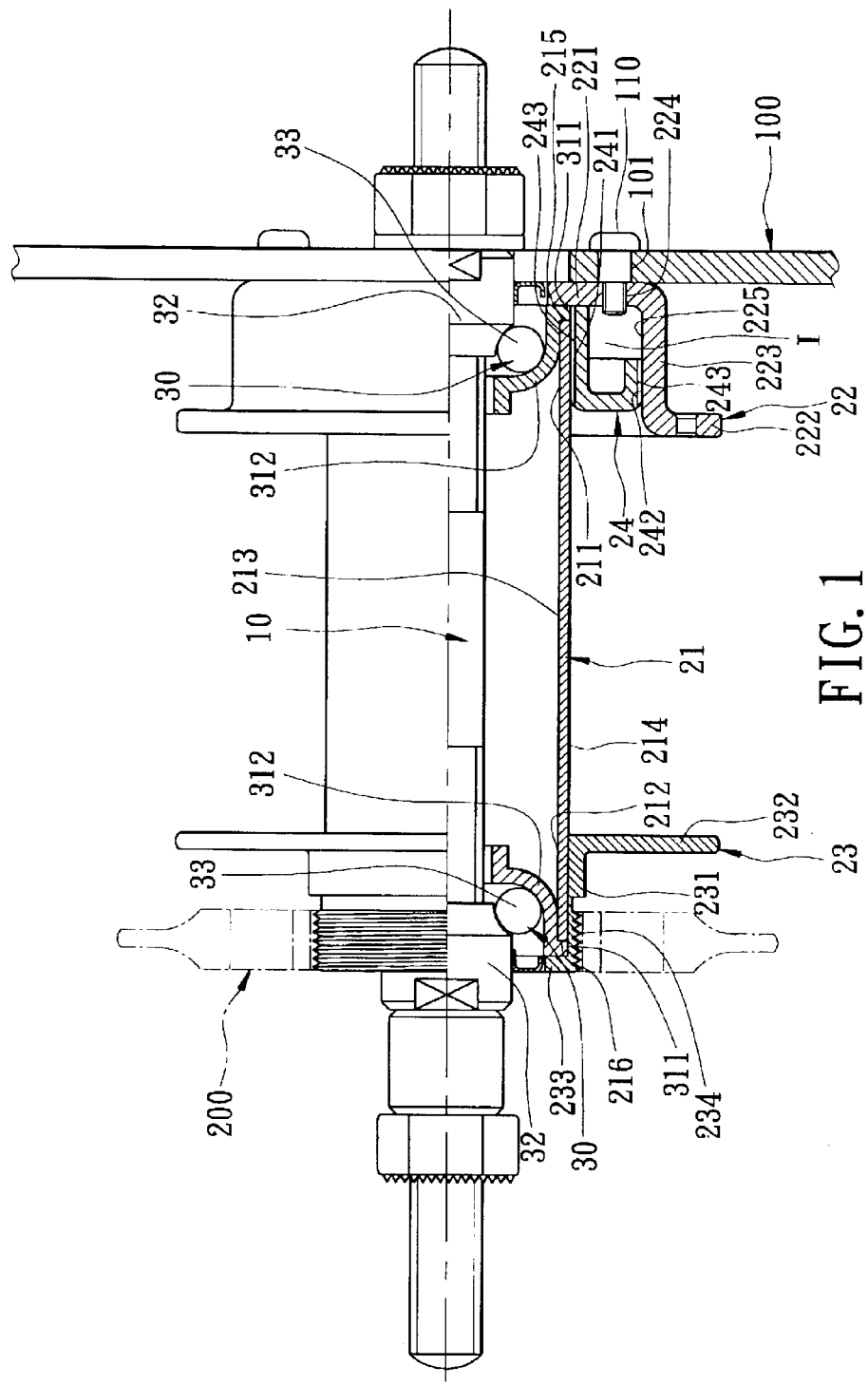
FIG. 1 is a partially sectional view of the first preferred embodiment of a brakable wheel hub device according to this invention.

Referring to FIG. 1, the first preferred embodiment of a brakable wheel hub device according to the present invention is shown to be rotatably mounted on a rear wheel axle 10 about an axis in an axial direction, and is shown to comprise a tubular wheel hub shell 21, a brake disk 100, right and left spoke mounting members 22, 23, and a force transmitting member 24.

The wheel hub shell 21 has inner and outer surrounding shell surfaces 213, 214 which are disposed opposite to each other radially, and annular right and left end surfaces 215, 216, each of which extends radially to communicate the inner surrounding shell surface 213 with the outer surrounding shell surface 214. The inner surrounding shell surface 213 is mounted to spacedly surround the axle 10 by means of right and left anti-frictional bearing members 30, and includes right and left inner surface segments 211, 212 that are proximate to the right and left end surfaces 215, 216, respectively.

The brake disk 100 is mounted to be rotatable relative to the axle 10 about the axis, and is disposed outboard to and confronts the right end surface 215 of the wheel hub shell 21. The brake disk 100 has a plurality of through holes 101 formed therethrough in the axial direction.

The right spoke mounting member 22 is formed by punching, and includes a securing wall portion 221 and a surrounding wall portion.

The securing wall portion 221 is mounted to surround the axis, and is disposed inboard to the brake disk 100. The securing wall portion 221 extends in radial directions relative to the axis to terminate at a periphery, and has a plurality of screw holes 224 formed therein and aligned with the through holes 101 in the brake disk 100, respectively. A tightening member includes a plurality of screw fasteners 110, each of which is brought to pass through a respective one of the through holes 101 and threadedly engage a corresponding one of the screw holes 224, thereby bringing the securing wall portion 221 to tightly abut against the brake disk 100.

The surrounding wall portion includes a force transmitting segment 223 and a spoke mounting segment 222. The force transmitting segment 223 extends from the periphery of the securing wall portion 221 leftwardly and in the axial direction, and has an inner tubular surface 225 which confronts the outer surrounding shell surface 214 of the wheel hub shell 21 radially to confine a surrounding space (I) therebetween, The spoke mounting segment 222 extends radially and outwardly from the inner tubular surface 225 opposite to the periphery of the securing wall portion 221 so as to be adapted to engage wheel spokes (not shown).

The force transmitting member 24 is received in the surrounding space (I), and has inner and outer frictional engaging surfaces 241, 242 which are disposed opposite to each other radially, and which frictionally and respectively engage the outer surrounding shell surface 214 of the wheel hub shell 21 and the inner tubular surface 225 of the right spoke mounting member 22. Preferably, the inner and outer frictional engaging surfaces 241, 242 are formed with protrusions 243 thereon so as to reinforce the frictional engagement of the inner and outer frictional engaging surfaces 241, 242 with the outer surrounding shell surface 214 and the inner tubular surface 225. As such, the right spoke mounting member 22 is synchronously rotated with the wheel hub shell 21.

The left spoke mounting member 23 is disposed on the wheel hub shell 21, and is opposite to the right spoke mounting member 22 along the axis. The left spoke mounting member 23 includes an axially extending wall portion 231 which is sleeved securely on the outer surrounding shell surface 214 adjacent to the left end surface 216, and a spoke mounting portion 232 which extends from the axially extending wall portion 231 radially and outwardly so as to engage wheel spokes (not shown). In this embodiment, the axially extending wall portion 231 includes an externally threaded segment 234 so as to engage a sprocket mechanism 200 of a bicycle (not shown). Alternatively, the left spoke mounting member 23 is formed integrally with the wheel hub shell 21.

The right anti-frictional bearing member 30 is a bowl-shaped type, and includes an outer surrounding race 312 which is disposed inwardly and leftwardly of the right end surface 215 of the wheel hub shell 21, a right mounting sleeve member 32 which is sleeved securely on the axle 10 in a known manner and which has a curved surrounding race portion, and a rolling member 33 which is interposed between the outer surrounding race 312 and the surrounding race portion of the right mounting sleeve member 32. A flange 311 extends from the outer surrounding race 312 rightwardly and radially so as to be sandwiched between the right end surface 215 and the securing wall portion 221, such that the flange 311 is secured to and rotated with the wheel hub shell 21. Similarly, the left anti-frictional bearing member 30 has the same construction as the right anti-frictional bearing member 30, and includes a flange 311 that is sandwiched between a radially and inwardly extending segment 233 extending from the externally threaded segment 234 and the left end surface 216.

In assembly, by means of the force transmitting member 24 which is press-fitted to the wheel hub shell 21 and the right spoke mounting member 22, the right spoke mounting member 22 can be secured to the wheel hub shell 21, and the brake disk 100 can be fastened to the securing wall portion 221 by means of the screw fasteners 110.

As illustrated, the right spoke mounting member 22 is made separately from the wheel hub shell 21 to form the spoke mounting segment 222 for engaging the wheel spokes, and the securing wall portion 221 for engaging the brake disk 100, thereby facilitating formation of the right spoke mounting member 22. In addition, assembly of the right spoke mounting member 22 to the wheel hub shell 21 is convenient to conduct.

Figure 2:
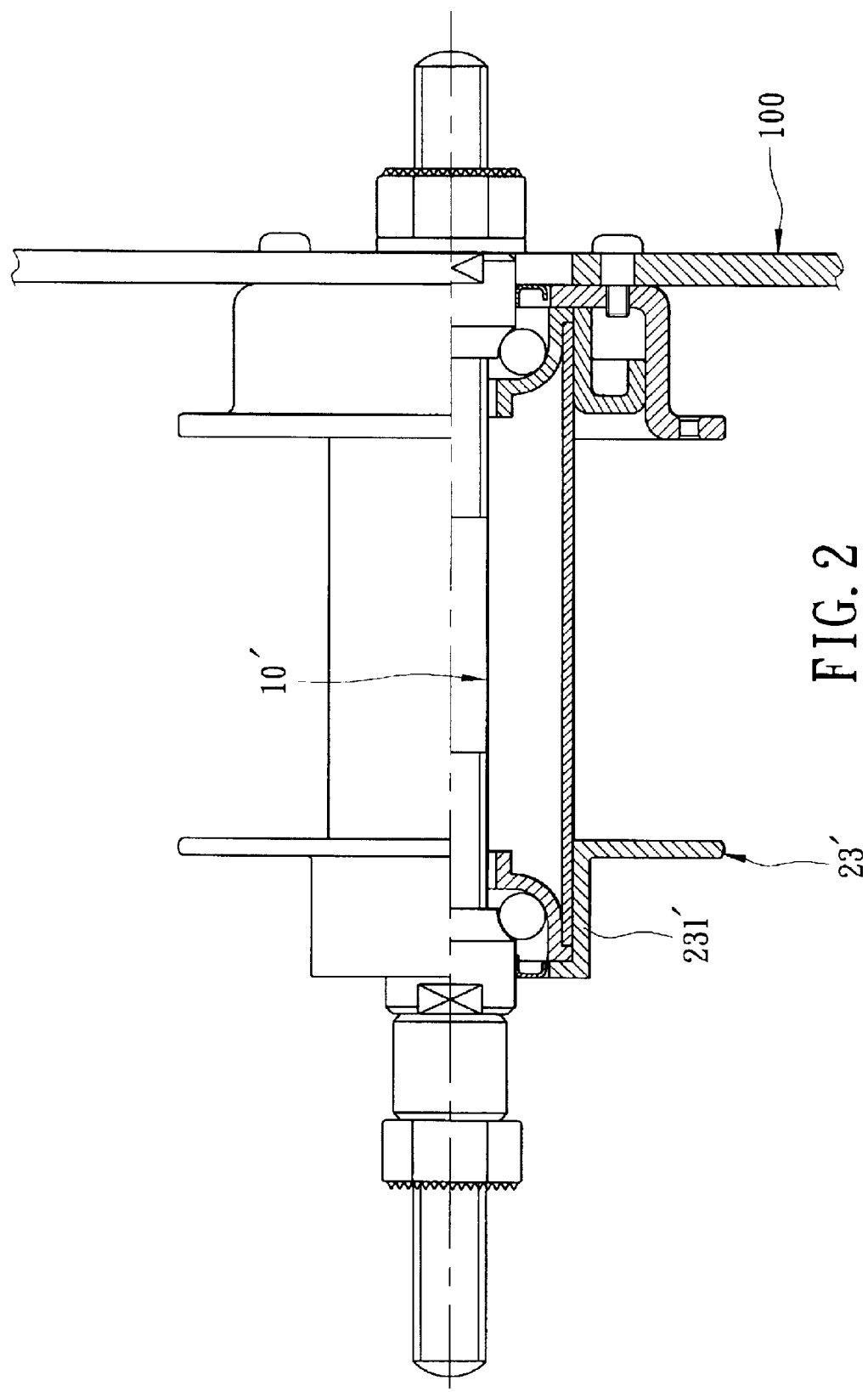
FIG. 2 is a partially sectional view of the second preferred embodiment of a brakable wheel hub device according to this invention.

Referring to FIG. 2, the second preferred embodiment of the brakable wheel hub device according to this invention is shown to be similar to the aforesaid embodiment in construction. The device of this embodiment is adapted to be mounted on a front wheel axle 10' of a bicycle, and includes a left spoke mounting member 23' which has an axially extending wall portion 231' that has a smooth outer surrounding surface without any external threads.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A brakable wheel hub device adapted to be rotatably mounted on an axle about an axis in an axial direction, said brakable wheel hub device comprising:

a wheel hub shell having inner and outer surrounding shell surfaces which are disposed opposite to each other in radial directions relative to the axis, and an annular right end surface which extends radially to connect said inner surrounding shell surface with said outer surrounding shell surface, said inner surrounding shell surface being adapted to spacedly surround the axle, and including right and left inner surface segments proximate to and distal from said right end surface, respectively;

a brake disk which is adapted to be rotatable relative to the axle about the axis, and which is outboard to and which confronts said right end surface;

a right spoke mounting member including
    a securing wail portion disposed to surround the axis and mounted inboard to said brake disk, said securing wall portion extending in radial directions relative to the axis to terminate at a periphery, and
    a surrounding wall portion extending from said periphery of said securing wall portion leftwardly and in the axial direction so as to be adapted to engage wheel spokes, and having an inner tubular surface which confronts said outer surrounding shell surface radially to confine a surrounding space therebetween;

a tightening member disposed to bring said securing wall portion to abut against said brake disk; and a force transmitting member received in said surrounding space, and having inner and outer frictional engaging surfaces which are disposed opposite to each other radially, and which frictionally and respectively engage said outer surrounding shell surface and said inner tubular surface such that said right spoke mounting member is synchronously rotated with said wheel hub shell.

2. The brakable wheel hub device of claim 1, wherein said surrounding wall portion includes a spoke mounting segment which extends radially and outwardly from said inner tubular surface opposite to said periphery of securing wall portion so as to be adapted to engage the wheel spokes.

3. The brakable wheel hub device of claim 1, further comprising an anti-frictional bearing member which includes an outer surrounding race that is disposed inwardly and leftwardly of said right end surface, said outer surrounding race being adapted to surround rotatably the axle, said anti-frictional bearing member further including a flange which extends from said outer surrounding race rightwardly and radially so as to be sandwiched between said right end surface and said securing wall portion, such that said flange is secured to and rotated with said wheel hub shell.

4. The brakable wheel hub device of claim 1, wherein one of said inner and outer frictional engaging surfaces is formed with protrusions thereon so as to reinforce frictional engagement of said one of said inner and outer frictional engaging surfaces with a respective one of said outer surrounding shell surface and said inner tubular surface.

5. The brakable wheel hub device of claim 4, wherein the other one of said inner and outer frictional engaging surfaces is formed with protrusions thereon so as to reinforce frictional engagement of said other one of said inner and outer frictional engaging surface with a respective one of said outer surrounding shell surfaces and said inner tubular surface.

6. The brakable wheel hub device of claim 1, further comprising a left spoke mounting member which is disposed on said wheel hub shell and which is opposite to said right spoke mounting member along the axis, said left spoke mounting member including an axially extending wall portion which is secured on said outer surrounding shell surface, and a spoke mounting portion which extends from said axially extending wall portion radially and outwardly and which is adapted to engage wheel spokes.

7. The brakable wheel hub device of claim 6, wherein said axially extending wall portion includes an externally threaded segment which is adapted to engage a sprocket mechanism of a bicycle.

8. The brakable wheel hub device of claim 1, wherein said brake disk has a plurality of through holes formed therethrough in the axial direction, said securing wall portion having a plurality of screw holes formed therein and respectively aligned with said through holes, said tightening member including a plurality of screw fasteners, each passing through a respective one of said through holes and engaging threadedly a corresponding one of said screw holes.

9. A brakable wheel hub device adapted to be rotatably mounted on an axle about an axis in an axial direction so as to secure a brake disk which surrounds the axle, said brakable wheel hub device comprising:

a wheel hub shell having inner and outer surrounding shell surfaces which are disposed opposite to each other in radial directions relative to the axis, and an annular right end surface which extends radially to connect said inner surrounding shell surface with said outer surrounding shell surface and which is adapted to confront the brake disk, said inner surrounding shell surface being adapted to spacedly surround the axle, and including right and left inner surface segments proximate to and distal from said right end surface, respectively;

a right spoke mounting member including a securing wall portion disposed to surround the axis and adapted to be mounted inboard to the brake disk, said securing wail portion extending in radial directions relative to the axis to terminate at a periphery, and a surrounding wail portion extending from said periphery of said securing wall portion leftwardly and in the axial direction so as to be adapted to engage wheel spokes, and having an inner tubular surface which confronts said outer surrounding shell surface radially to confine a surrounding space therebetween;

a tightening member disposed to bring said securing wall portion to be adapted to abut against the brake disk; and a force transmitting member received in said surrounding space, and having inner and outer frictional engaging surfaces which are disposed opposite to each other radially, and which frictionally and respectively engage said outer surrounding shell surface and said inner tubular surface such that said right spoke mounting member is synchronously rotated with said wheel hub shell.

* * * * *